United States Patent

Powers

[11] Patent Number: 5,824,134
[45] Date of Patent: Oct. 20, 1998

[54] DIRECT REDUCTION OF IRON ORE UTILIZING ORGANIC HAZARDOUS MATERIALS

[76] Inventor: Jim Powers, 3 Santa Lucia Ave., Ormond Beach, Fla. 32174

[21] Appl. No.: 790,527

[22] Filed: Jan. 29, 1997

[51] Int. Cl.[6] .................................................. C21B 13/04
[52] U.S. Cl. ........................ 75/473; 75/505; 75/670; 75/961; 588/206; 588/215; 588/220; 588/223; 423/439
[58] Field of Search ............................. 75/505, 473, 670, 75/691; 588/206, 215, 220, 223; 423/439

[56] References Cited

U.S. PATENT DOCUMENTS

| | | | |
|---|---|---|---|
| Re. 32,247 | 9/1986 | Stephens Jr. ................................. | 75/11 |
| 4,834,792 | 5/1989 | Becerra-Novoa ........................... | 75/496 |
| 5,244,490 | 9/1993 | Agarwal ..................................... | 75/581 |
| 5,322,544 | 6/1994 | Stebbing ..................................... | 75/10.66 |
| 5,425,792 | 6/1995 | Bishop et al. .............................. | 75/493 |
| 5,443,572 | 8/1995 | Wilkinson et al. ........................ | 266/46 |

FOREIGN PATENT DOCUMENTS 28 41 039   3/1980   Germany ................ 588/206

Primary Examiner—Melvyn Andrews

[57] ABSTRACT

The use of and methods to use a novel category of hydrocarbon for direct reduction of iron ore. The novel hydrocarbons used as reducing feedstocks would normally be destined to become hazardous wastes or else their products of decomposition would be hazardous wastes. Such hydrocarbons are inclusive of but not limited to organic phosphates, organic sulfates, organic nitrogens, organic mercury or tin, contaminated hydrocarbons, and halogenated hydrocarbons. This category of hydrocarbons is otherwise difficult to utilize, incinerate, or otherwise dispose of safely. Polluting byproducts are almost always released. However a DRI reactor is herin fitted to utilize them productively and safely. These hydrocarbons would be used as an alternative to or admixture with the usual hydrocarbon feedstocks of choice, methane or related short chain hydrocarbons.

1 Claim, 1 Drawing Sheet

DIRECT REDUCTION OF IRON ORE UTILIZING ORGANIC HAZARDOUS MATERIALS

FIELD OF INVENTION

This invention involves use of a novel class of hydrocarbon feedstocks that offer a distinct economic advantage for Direct Reduction of Iron (DRI) as an alternative to commonly used methane or related short chain hydrocarbon feedstocks.

DISCUSSION OF PRIOR ART

Hydrocarbons with associated polluting fractions are proposed as DRI feedstocks in this invention. They would in the normal course of events be classed as or decompose into organic hazardous wastes. Incineration of hazardous hydrocarbon wastes or injecting them into a crucible of molten iron (described in U.S. Pat. No. 5,443,572) has been attempted with variable success at keeping pollutants from passing up the stack.

Direct Reduction of Iron oxide to iron and carburization of that iron to iron carbide has been described in U.S. Pat. No. Re.32247. Methane is the hydrocarbon of choice for this process although use of related short chain hydrocarbons has been postulated.

DRI and direct conversion of iron carbide to steel in electric furnace or basic oxygen furnace already shows a competitive advantage over pig iron production and conversion with scrap metal into steel. Steel making has become very competitive; therefore profits are slim. Any process that adds profit is a great advantage to a producer in this crowded field.

OBJECTS AND ADVANTAGES

Accordingly, objects and advantages of my invention are:

It provides a significant source of added revenue to the operators of a DRI reactor because the novel hydrocarbons used as feedstocks would normally be destined to become hazardous wastes or else their products of decomposition would be hazardous wastes for which disposal is expensive.

Suppliers of such feedstocks would pay dearly to a DRI processor to accept and consume as feedstock hydrocarbons such as organic phosphates, organic sulfates, organic nitrogens, organic mercury or tin, contaminated hydrocarbons, and halogenated hydrocarbons. These materials are difficult and expensive to incinerate or otherwise dispose of safely for polluting discharges are almost always released.

A DRI as hazardous feedstock reactor has the advantages that it would require much lower net energy and temperature than any of various hazardous waste incinerators and is essentially a closed pressurized reactor with no polluting stack.

The main DRI reaction byproduct is water.

Carbon is not wasted up the stack as polluting $CO_2$, but is incorporated and shipped with the iron as iron carbide.

The catalyst that cracks the hazardous waste molecules does not have to be decarburized as does y-zeolite catalyst in petroleum cat crackers since the carburized iron compounds functioning as cracking catalyst in the fluidized bed (or other DRI reactor) are shipped as the end product.

Hydrocarbons with associated polluting fractions are pyrolyzed/cracked/reformed into progressively smaller carbon chains into $CH_4$, $CO$, $CO_2$, $H_2O$, $H_2$ and polluting fractions in the reaction zone of the fluidized bed (or other DRI reactor) of iron oxide. The $CO$ and $H_2$ are required to reduce the iron oxide and the $CH_4$, and $CO$ carburize the metallic iron.

The water along with polluting fractions; halogens, phosphates, sulfates, nitrates, and heavy metals such as mercury or tin can be continuously scrubbed from the reducing gases in water solution or in ion scrubbers added for that purpose.

Optionally, depending upon characteristics of the hydrocarbon feedstock. A preliminary pyrolysis step may be used to partially pre-reform/crack the material into a more suitable reducing and carburizing mixture. This step has the advantage of permitting pre-scrubbing the gas to purge halogen, phosphates, sulfates, nitrates, metals, or other fractions characteristic of the hydrocarbon feedstock that might lower the quality of the iron product.

DETAILED DESCRIPTION OF DRAWING

Figure 1:
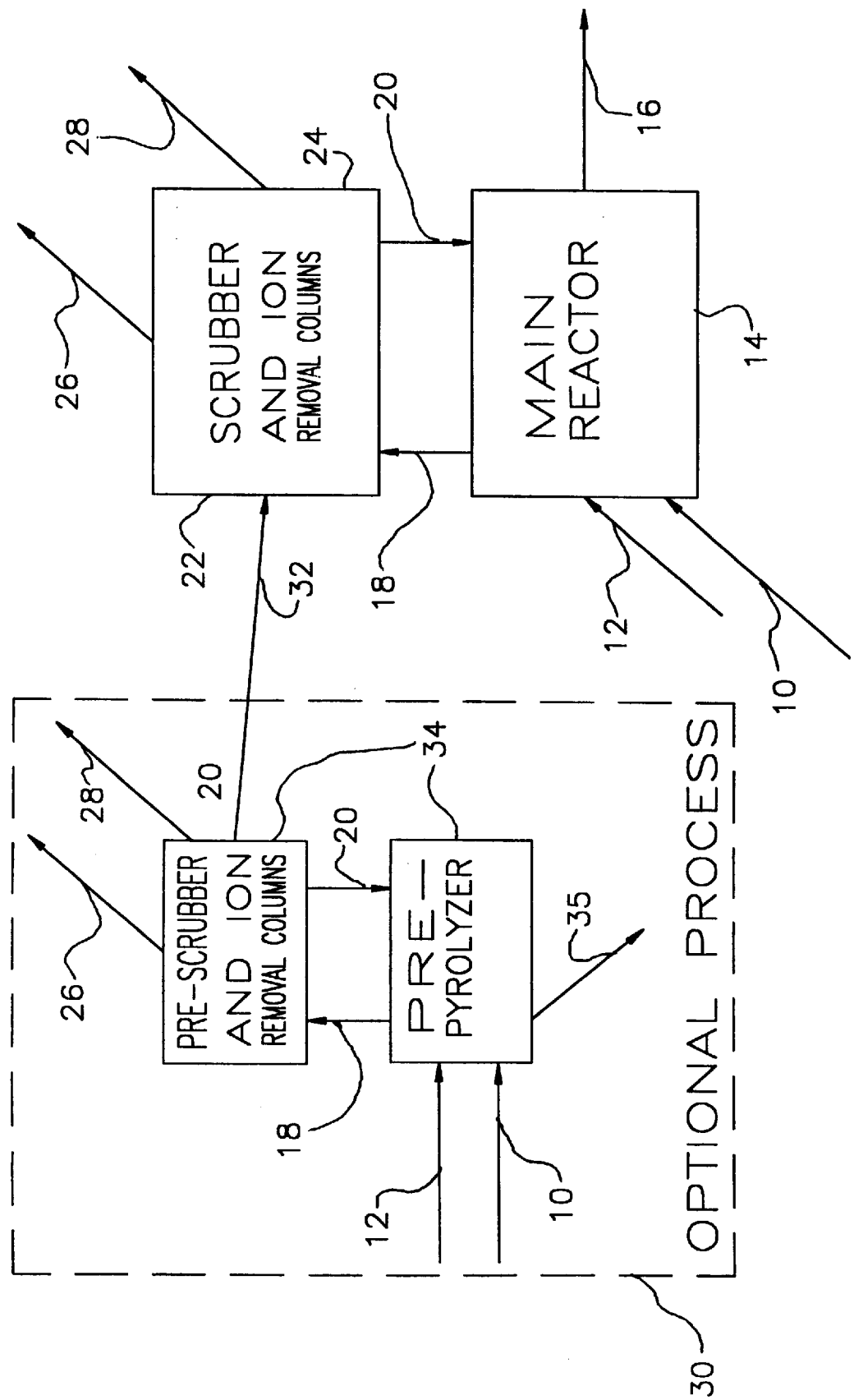

The right half shows a Main Reactor for a generic DRI process indicating mixed hydrocarbon feedstock, the left half within a dashed box an optional similar reactor for a process that pre-reacts hydrocarbon feedstocks that produce questionable iron products before passing scrubbed reducing gases to Main Reactor.

LIST OF REFERENCE NUMERALS

| | |
|---|---|
| 10 | mixed hydrocarbon feedstock; would-be wastes plus optional methane |
| 12 | iron oxide feedstock |
| 14 | Main Reactor |
| 16 | iron carbide product |
| 18 | wet reducing/carburizing gases and polluting fractions |
| 20 | reducing/carburizing gases with polluting fractions and water removed |
| 22 | scrubber designed for more corrosive gases |
| 24 | ion columns supplanting condensed water solutions for removing pollutants |
| 26 | contaminant/water solution discharge |
| 28 | discharge from columns |
| 30 | Optional Reactor |
| 32 | reducing/carburizing gases with polluting fractions and water removed in optional pre-scrubber |
| 34 | scrubber and reactor similar to main DRI process but with questionable iron products |
| 35 | variable quality iron, iron oxide, and iron carbide |

SUMMARY

This invention is a process for direct reduction of iron ore utilizing (partly or entirely) hydrocarbons with polluting fractions. Such feedstocks are normally difficult to work with. The process is specifically modified DRI (See FIG. 1) using reformed reduction gases made at least in part from pyrolysis of various novel materials; hydrocarbons such as organic phosphates, organic sulfates, organic nitrogens, organic mercury and tin, or halogenated hydrocarbons, which are either toxic or normally have relatively toxic or objectionable products of decomposition. These feedstocks might otherwise be destined to be hazardous waste materials. These materials are difficult to incinerate or otherwise dispose of safely. Polluting byproducts are almost always released. However in this invention their reaction products in this DRI reactor are non-objectionable. Suppliers of such feedstocks would pay dearly to provide such hydrocarbons to a DRI processor to save disposal costs. This would add to that processor's revenues and prevent the need to purchase some or all the usual methane feedstock.

DESCRIPTION OF INVENTION

On the right half of the drawing is a block diagram of a generic DRI plant with minor modifications. The modifications needed for this invention are provisions for more corrosive gases and specialized columns to help water scrubber dispose of the polluting fraction introduced by feedstocks with a polluting fraction.

On the left half of the drawing within dashed lines is a block diagram of a similar reactor that can optionally pre-treat hydrocarbons when the objectionable fraction might affect iron quality or reaction efficiency in the Main Reactor.

OPERATION OF THE PREFERRED EMBODIMENT

Hydrocarbons with associated polluting fractions 10 (mixed with or without the usual methane) are pyrolyzed/cracked/reformed progressively into hot $CH_4$, CO, $CO_2$, $H_2$, and $H_2O$ mixed with polluting fractions 18 within the reaction zone (Main Reactor) 14 a fluidized bed (or other DRI reactor) of iron oxide. The CO and $H_2$ 20 reduce the iron oxide 12 when it enters the reactor and the $CH_4$ and CO 20 carburize the metallic iron into iron carbide product 16. Polluting fractions are also cracked from the hydrocarbons with associated polluting fractions. Such materials including halogens, phosphates, sulfates, nitrates, and heavy metals can be continuously scrubbed 22 from the reducing gases in water solution 26 and/or in ion scrubbers 24 and 28 added for that purpose.

Optionally, depending upon characteristics of the hydrocarbon feedstock a preliminary pyrolysis step 30 may be used to partially pre-reform/crack the material into a more suitable reducing and carburizing mixture 32. This step has the advantage of permitting pre-scrubbing the gas to purge halogen, phosphates, sulfates, nitrates, metals, or other ions characteristic of the hydrocarbon feedstock that might lower the quality 34 and 35 of the iron product.

OTHER EMBODIMENTS STATIC AND OPERATION DESCRIPTION

Smaller or specialized DRI reactors intended primarily for disposal of hazardous wastes rather than efficient DRI are a logical embodiment and might have wide application. Tires, plastics, medical wastes might be disposed of as well as hydrocarbons described in the preferred embodiment. Efficient commercial production of iron carbide is not precluded in such specialized reactors.

CONCLUSION RAMIFICATION AND SCOPE OF INVENTION

My invention provides a significant source of added revenue to the operators of a DRI reactor because the novel hydrocarbons used as feedstocks would normally be destined to become hazardous wastes or else their products of decomposition would be hazardous wastes. Suppliers of such feedstocks would pay dearly to a DRI processor to take and consume as feedstock hydrocarbons such as organic phosphates, organic sulfates, organic nitrogens, organic mercury or tin, contaminated hydrocarbons, and halogenated hydrocarbons.

These materials are difficult to incinerate or otherwise dispose of safely. Polluting byproducts are almost always released. However a DRI reactor uses much lower net energy and temperatures than any of various hazardous waste incinerators and is essentially a closed reactor with no stack. The main reaction byproduct is water. Carbon is not wasted but shipped with the iron.

The iron catalyst that cracks the hazardous waste molecules does not have to be decarburized as does y-zeolite catalyst in petroleum cat crackers since carburized iron compounds functioning as catalyst in the fluidized bed (or other DRI reactor) is shipped as the end product. Hydrocarbons with associated polluting fractions are pyrolyzed/cracked/reformed progressively into $CH_4$, CO, $CO_2$, $H_2O$, and $H_2$ in the reaction zone of the fluidized bed (or other DRI reactor) of iron oxide. The CO and $H_2$ are required to reduce the iron oxide and the $CH_4$ and CO carburize the metallic iron.

The water along with halogens, phosphates, sulfates, nitrates, and heavy metals can be continuously scrubbed from the reducing gases in water solution or in ion scrubbers added for that purpose.

Optionally, depending upon characteristics of the hydrocarbon feedstock a preliminary pyrolysis step may be used to partially pre-reform/crack the material into a more suitable reducing and carburizing mixture.

This step has the advantage of permitting pre-scrubbing the gas to purge halogen, phosphates, sulfates, nitrates, metals, or other ions characteristic of the hydrocarbon feedstock that might lower the quality of the iron product.

I claim:

1. A method of making iron carbide and iron by direct reduction of iron oxide in a closed pressurized DRI reactor by utilizing hydrocarbons comprising organic hazardous materials, or optionally as an admixture with methane comprising the steps of:

a) supplying said reactor with iron ore as an iron source;

b) supplying hydrocarbons comprising organic hazardous materials having associated polluting fractions selected from the group consisting of organic phosphates, organic sulfurs, organic nitrogens, organic mercury and organic tin and optionally methane;

c) dissociating by pyrolysis said hydrocarbons into a heated reducing gas comprising $CH_4$, CO, $CO_2$, $H_2$ and $H_2O$ and remnants of said polluting fractions selected from the group consisting of mercury, tin and acid gases of phosphates, sulfurs or nitrates, said constituents characteristic of the hydrocarbon feedstock selected;

d) reducing said iron ore with said reducing gas to form iron and carburizing said iron to form iron carbide and to form an off gas including $H_2O$ and containing polluting fractions selected from the group consisting of mercury, tin and acid gases of phosphates, sulfurs or nitrates and e) continuously scrubbing said off-gas to purge said off-gas of any $H_2O$ and any polluting fractions including any mercury, tin or acid gases of phosphates, sulfurs or nitrates characteristic of the feed stock that otherwise lowers the quality of the iron products.

* * * * *